US009828646B2

(12) United States Patent
Dengel

(10) Patent No.: US 9,828,646 B2
(45) Date of Patent: Nov. 28, 2017

(54) METAL MAKING LANCE WITH SPRING-LOADED THERMOCOUPLE OR CAMERA IN LANCE TIP

(71) Applicant: Derek S. Dengel, Harmony, PA (US)

(72) Inventor: Derek S. Dengel, Harmony, PA (US)

(73) Assignee: Berry Metal Company, Harmony, PA (US)

( * ) Notice: Subject to any disclaimer, the term of this patent is extended or adjusted under 35 U.S.C. 154(b) by 149 days.

(21) Appl. No.: 14/659,238

(22) Filed: Mar. 16, 2015

(65) Prior Publication Data

US 2015/0259761 A1 Sep. 17, 2015

Related U.S. Application Data

(60) Provisional application No. 61/952,997, filed on Mar. 14, 2014.

(51) Int. Cl.
C21C 5/30 (2006.01)
C21C 7/00 (2006.01)
C21C 5/46 (2006.01)
F27D 3/16 (2006.01)
F27D 21/00 (2006.01)
F27D 21/02 (2006.01)
F27D 19/00 (2006.01)

(52) U.S. Cl.
CPC ............. *C21C 5/30* (2013.01); *C21C 5/4606* (2013.01); *C21C 7/00* (2013.01); *F27D 3/16* (2013.01); *F27D 21/0014* (2013.01); *F27D 21/02* (2013.01); *C21C 2005/4626* (2013.01); *F27D 2003/169* (2013.01); *F27D 2019/0006* (2013.01); *F27D 2021/026* (2013.01)

(58) Field of Classification Search
CPC ...................................................... C21C 5/30
USPC ......................................................... 266/225
See application file for complete search history.

(56) References Cited

U.S. PATENT DOCUMENTS 6,599,464 B1 * 7/2003 Feldhaus ............... C21C 5/30
266/225
2015/0259761 A1 * 9/2015 Dengel .................. C21C 5/30
266/81

* cited by examiner

*Primary Examiner* — Scott Kastler
(74) *Attorney, Agent, or Firm* — Paul D. Bangor, Jr.; Clark Hill, PLC

(57) ABSTRACT

An oxygen blowing lance comprising: a lance body including an oxygen conduit and cooling water inlet and outlet conduits surrounding said oxygen conduit; a lance head connected to said lance body and comprising a nozzle body, said nozzle body including a central strut having bore hole, a plurality of nozzles arranged about said central strut, and a plurality of cooling chambers arranged about said central strut, wherein said plurality of nozzles are in fluid communication with said oxygen conduit for discharging oxygen from said oxygen conduit onto a metal bath in a converter vessel, and wherein said plurality of cooling chambers are in fluid communication with said cooling water inlet and outlet conduits; a temperature probe or camera assembly received in said bore hole for monitoring the temperature of said lance head or molten heat in which the lance is inserted; signal lines connected to said temperature probe for conveying signals from said temperature probe whereby operation of said blowing lance is regulated in response to said signals; and a protective pipe pressurized with a gas disposed in the bore and surrounding said temperature probe assembly and the signal lines.

6 Claims, 9 Drawing Sheets

METAL MAKING LANCE WITH SPRING-LOADED THERMOCOUPLE OR CAMERA IN LANCE TIP

CROSS REFERENCE TO RELATED APPLICATIONS

This application claims priority to, and the benefit of, the U.S. provisional patent application U.S. Patent Applications Ser. No. 61/952,997 filed on Mar. 14, 2014, which is hereby incorporated by reference in its entirety for all purposes.

BACKGROUND

The present disclosure represents improvements upon the disclosure of U.S. Pat. No. 6,599,464, incorporated by reference herein in its entirety.

For the metallurgical treatment of molten steel in a converter, oxygen is blown onto the top of the molten steel under the control of a blowing lance. The oxygen lance is subjected to a high thermal load during this top blowing, particularly on its front end. It is therefore typical to cool the lance down intensively. The most effective way to cool an oxygen blowing lance is to thoroughly flush die head of the lance with a large volume of cool water under high pressure. The head of the lance is made of a material with good thermal conductivity, such as copper. High temperature peaks up to 3000 degrees C., particularly at the front end of the lance head which is the focus of heat radiating from the surface of the bath as well as wear and tear lead over time to a reduction in the thickness of the cooling chamber walls found in the head of the lance. If there is not enough distance between the head of the lance and the molten metal, the walls can weaken rapidly and suddenly rupture because they have been weakened. Any release of water vaporizes explosively and damages more than just the metallurgical process. If the lance head ruptures, the treatment of the enamel must also be terminated immediately.

To avoid the danger of a water release while simultaneously cooling the lance even when the lance is plunged into the molten steel melt, there is a process (DE 35 43 836 C2), which employs two blowing lances used in rotation. These two lances are cooled alternately and intensively with cool air and then with cool water. The lance in the blow position which is being plunged into the molten steel is cooled with cool air while the other lance outside of the molten steel is cooled intensively with cool water. By repeatedly switching as needed between cool air cooling and cool water cooling the overheating of either lance can be avoided, the advantage of effectively avoiding a water release is the cost of purchasing a second lance.

Starting at this point in the state of technology the disclosure concerns a process for the refinement of molten steel in a converter with top blown oxygen on the molten steel surface with a water cooled blowing lance made up of a 'shafted' lance body and a lance head.

Furthermore, the disclosure concerns a water cooled oxygen blowing lance made up of a shafted lance body and lance head, for implementation of this process more specifically, with an oxygen supply that runs through the lance body and flows to blowing nozzles distributed in the lance head and with outlet and inlet passageways for water running through the lance body to the cooling chambers in the lance head.

The disclosure is based on the task of achieving a process as above with which the metallurgical blowing process is monitored and controlled. The disclosure is also based on the task of creating an oxygen blowing lance that to a great extent is protected from the release of water.

According to the process, the problem is solved in that the temperature in the lance head of the blowing lance, which is transferred from the molten steel to the lance head is monitored using at least one of the temperature probes which are integrated into the lance head and regulated by cooling off with water and/or with an oxygen supply and/or the addition of aggregates and/or the distance of the lance head from the molten metal bath, In the process, the abrasion on the front end of the lance head as a function of the tool life and the temperature curve as a function of the tool life can be primarily considered as correction sizes. With the addition of aggregates it can be assumed that the rate and the time of the addition influence temperature regulation. In particular, scrap for cooling, briquettes, ores, lime and other similar things are considered as aggregates.

In the disclosure the temperature of the melting bath surface radiating directly onto the front end of the lance head is detected through the temperature in the lance head. Using this measurement of the temperature the metallurgical process of the refinement can be controlled. At the same time the head of the blowing lance can be protected from the release of water through the various individual steps or through a combination of measures.

It is true that it is already known how to determine temperature for water cooled blowing lances (JP 62-278217 A) in the treatment of enamels but such a blowing lance is used in another process and with other objectives. In this process the blowing lance is actually submerged in the enamel and the level of the slag of the molten metal relative to the blowing lance is determined by temperature probes which are staggered inside the lance body. In this known process though, protection from overheating by detecting the temperature of the lance and controlling the treatment process are not dealt with.

With the oxygen top blowing lance the above task is solved by integrating at least one temperature probe in the lance head behind its front end and between the cooling chambers, the signal lines of which are ducted through the lance body.

With the disclosure the temperature of the local area in the lance head can be determined, and from experience used as an indicator of the danger of rupturing. Thus there is a requirement for an immediate reaction to imminent collapse whether it be due to the outside wall of the lance head being too thin or becoming too weak.

In order to be able to mount the signal lines of (lie temperature probes simply and to be able to protect them they are in a central, protective pipe. This pipe should not have any connection to the process medium oxygen or to the cooling medium water. This is thus particularly advantageous and contributes to the reliability of operation if the head of the lance is burned down to the temperature probes integrated within it and is therefore open. In this situation it is therefore impossible for there to be a leak of oxygen and/or cooling water. In a preferred set tip the oxygen piping is situated in the middle of the lance head and surrounded with inlet and outlet channels for the cooling water through the formation of coaxial ring channels, where the outermost ring channel is the outlet channel and the center ring channel is the inlet channel.

In order to make the assembly work required when switching out a deteriorated lance head for a new one as easy as possible the temperature probe can be put in a bore hole of a nose saddle of the lance head using a disconnectable adapter which is secured inside the lance head. To ensure an error free measurement of temperature it is advantageous for the temperature probe to be kept in contact with the floor of the bore hole by a spring so that it can conduct heat.

For technical assembly reasons as well as for length compensation with various thermal linear expansions of the protective tube and the oxygen pipe, the protective pipe should overlap and seal the adapter like a telescopic sleeve.

In the blowing process the most extreme thermal damage to the oxygen blowing lance is sustained by the lance head. As a result the head of the oxygen lance is subjected to the most wear and tear and should be interchangeable. In order to make it easier to change out the lance head one of the set ups of the disclosure provides for there being coaxial fittings at the cooling chambers of the lance heads for continuing coaxial inlet and outlet cool water channels. These fittings may then be welded on to the continuing coaxial inlet and outlet channels.

SUMMARY OF THE INVENTION

In a preferred aspect, the present disclosure comprises an oxygen blowing lance comprising: a lance body including an oxygen conduit and cooling water inlet and outlet conduits surrounding said oxygen conduit; a lance head connected to said lance body and comprising a nozzle body, said nozzle body including a central strut having bore hole, a plurality of nozzles arranged about said central strut, and a plurality of cooling chambers arranged about said central strut, wherein said plurality of nozzles are in fluid communication with said oxygen conduit for discharging oxygen from said oxygen conduit onto a metal bath in a converter vessel, and wherein said plurality of cooling chambers are in fluid communication with said cooling water inlet and outlet conduits; a temperature probe assembly received in said bore hole for monitoring the temperature of said lance head; signal lines connected to said temperature probe for conveying signals from said temperature probe whereby operation of said blowing lance is regulated in response to said signals; and a protective pipe pressurized with a gas disposed in the bore and surrounding said temperature probe assembly and the signal lines.

In another preferred aspect of the oxygen blowing lance of the present disclosure, the protective pipe is disposed within said oxygen conduit or one of said cooling water conduits.

In yet another preferred aspect of the oxygen blowing lance of the present disclosure, the bore hole has a floor and wherein said oxygen blowing lance further comprises means for forcing said temperature probe toward said bore hole floor.

In another preferred aspect of the oxygen blowing lance of the present disclosure, the means for forcing comprise resilient means.

In another preferred aspect of the oxygen blowing lance of the present disclosure, the resilient means is a spring.

In yet another preferred aspect of the present disclosure, the oxygen blowing lance of further comprises braided wire leads on the thermocouple.

In another preferred aspect, the present disclosure comprises an oxygen blowing lance comprising: a lance body including an oxygen conduit and cooling water inlet and outlet conduits surrounding said oxygen conduit; a lance head connected to said lance body and comprising a nozzle body, said nozzle body including a central strut having bore hole, a plurality of nozzles arranged about said central strut, and a plurality of cooling chambers arranged about said central strut, wherein said plurality of nozzles are in fluid communication with said oxygen conduit for discharging oxygen from said oxygen conduit onto a metal bath in a converter vessel, and wherein said plurality of cooling chambers are in fluid communication with said cooling water inlet and outlet conduits; a camera assembly received in said bore hole for gathering/taking photos, videos and/or other optical based measurements or information from inside the furnace or molten heat in which the lance is inserted; signal lines connected to said camera assembly for conveying signals from said camera assembly whereby operation of said blowing lance is regulated in response to said signals; and a protective pipe pressurized with a gas disposed in the bore and surrounding said camera assembly and the signal lines.

In another preferred aspect of the oxygen blowing lance of the present disclosure, the protective pipe is disposed within said oxygen conduit or one of said cooling water conduits.

In yet another preferred aspect of the oxygen blowing lance of the present disclosure, the bore hole has a floor and wherein said oxygen blowing lance further comprises means for forcing said camera assembly toward said bore hole floor.

In another preferred aspect of the oxygen blowing lance of the present disclosure, the means for forcing comprise resilient means.

In yet another preferred aspect of the oxygen blowing lance of the present disclosure, the resilient means is a spring.

In yet another preferred aspect of the present disclosure, the oxygen blowing lance of further comprises braided wire leads on the camera assembly.

BRIEF DESCRIPTION OF THE DRAWINGS

The disclosure is explained more clearly in the following with the help of an illustration that shows an example of an implementation. In detail the figures show.

DETAILED DESCRIPTION

Figure 1:
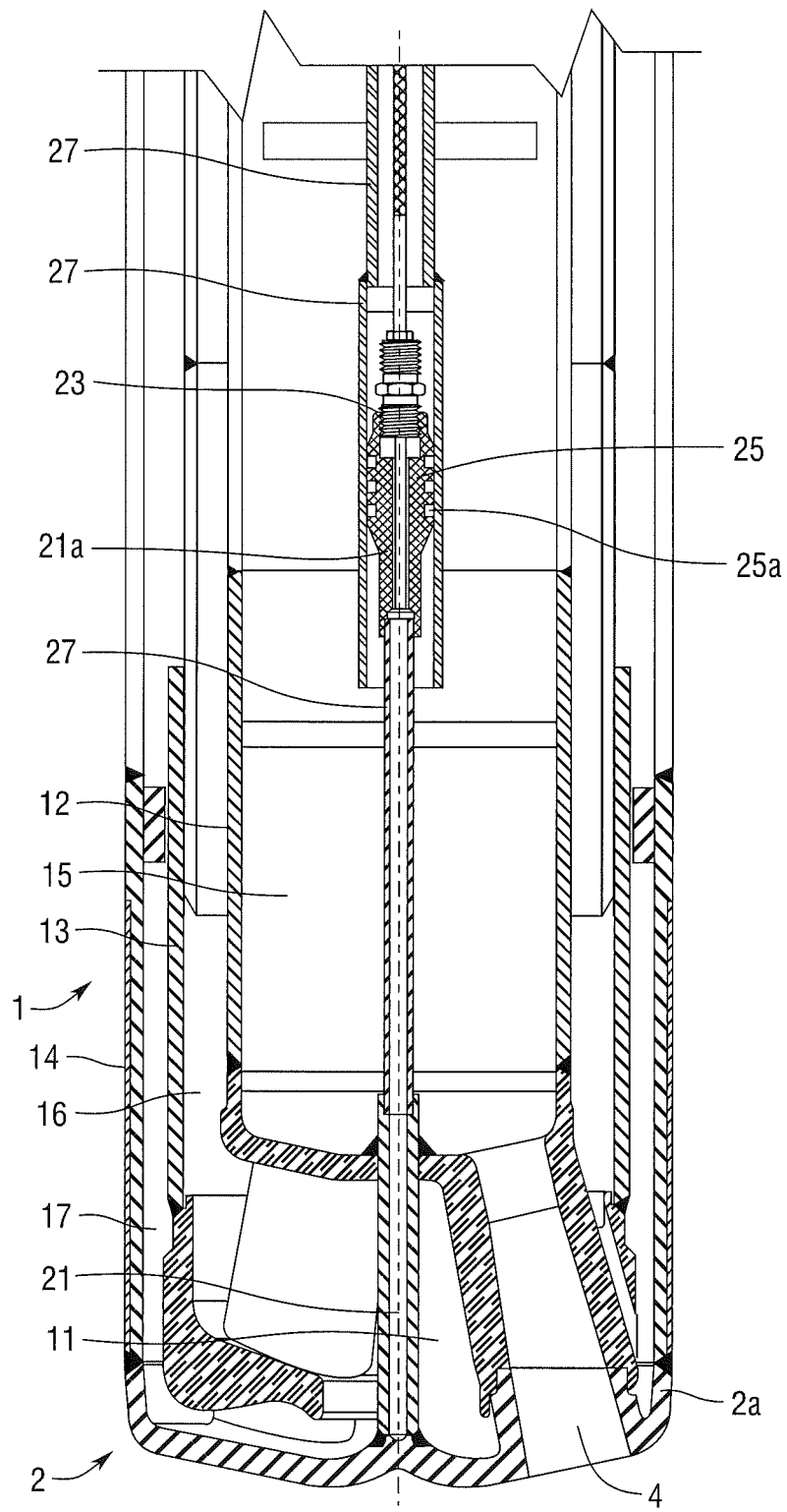
FIGS. 1 and 1A show the axial section of an oxygen blowing lance.
Figure 1A:
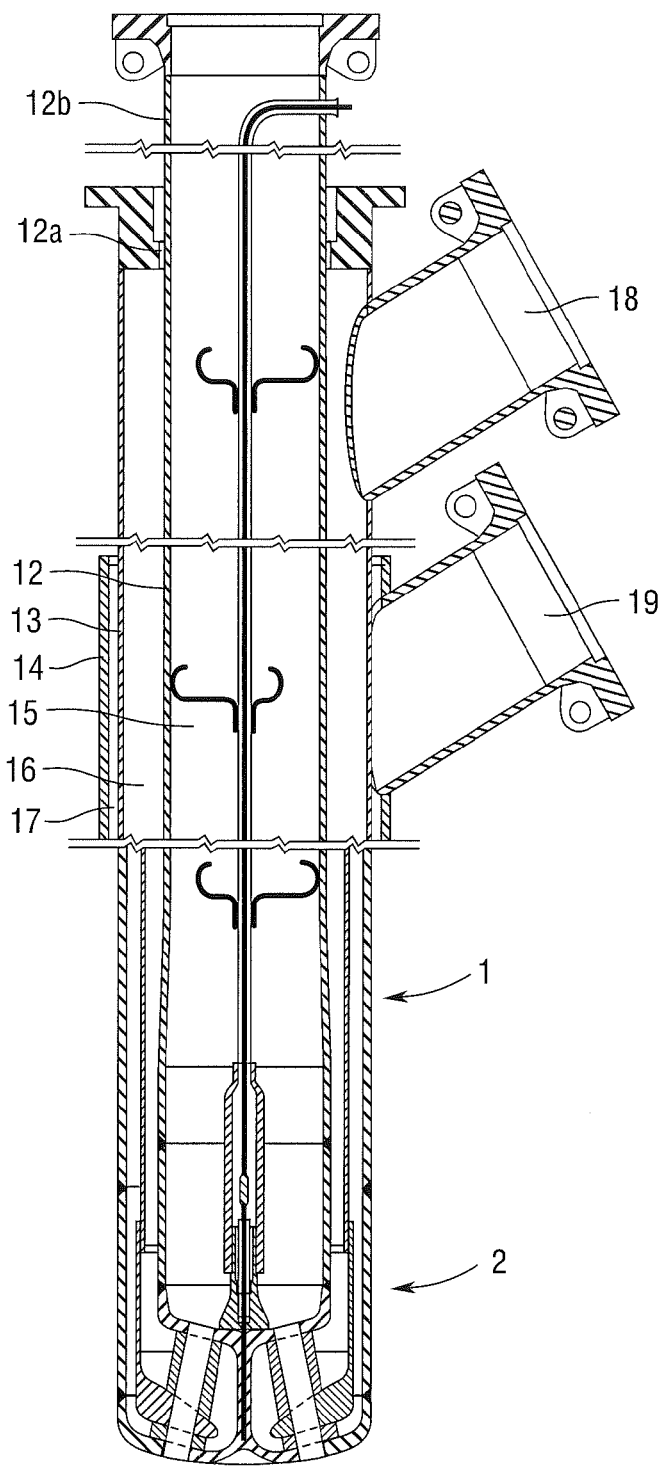
Figure 2:
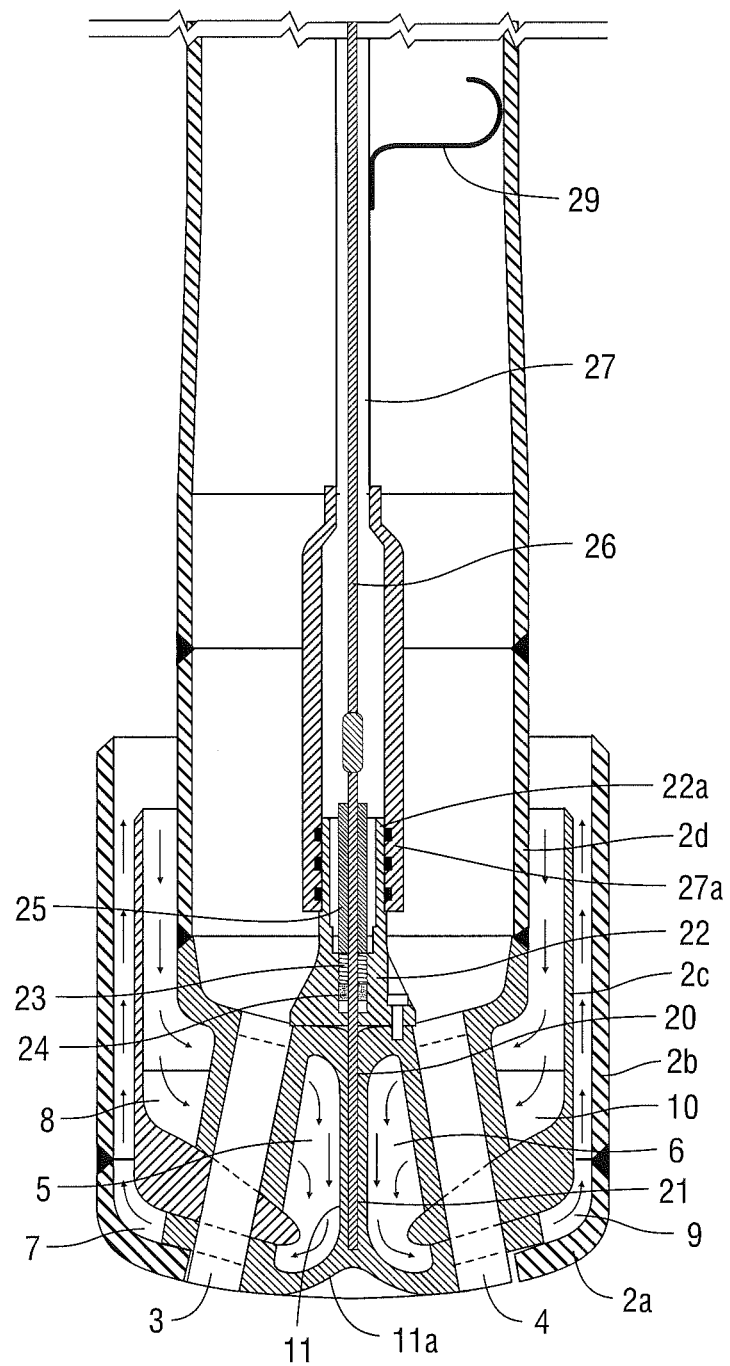
FIG. 2 an axial section of the lower part of the oxygen blowing lance in accordance with FIG. 1 as an enlarged drawing, FIG. 3 an axial section of the lower part of the oxygen blowing lance in accordance with FIG. 1 without the lance head and as an enlarged drawing, FIG. 4 an axial section of the upper part of the oxygen blowing lance in accordance with FIG. 1 and as an enlarged drawing, FIG. 5 the cross section of die oxygen blowing lance along the line B-B in FIG. 4, and FIG. 6 cross section of the oxygen blowing lance along the line C-C in FIG. 4.
Figure 3:
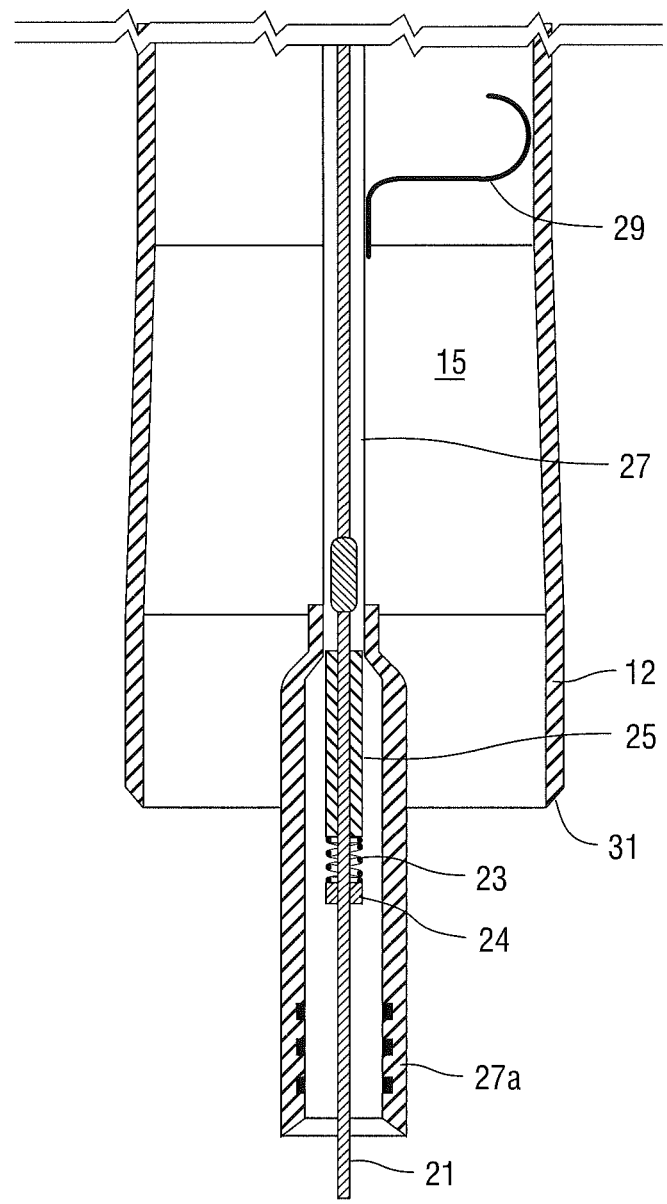
Figure 4:
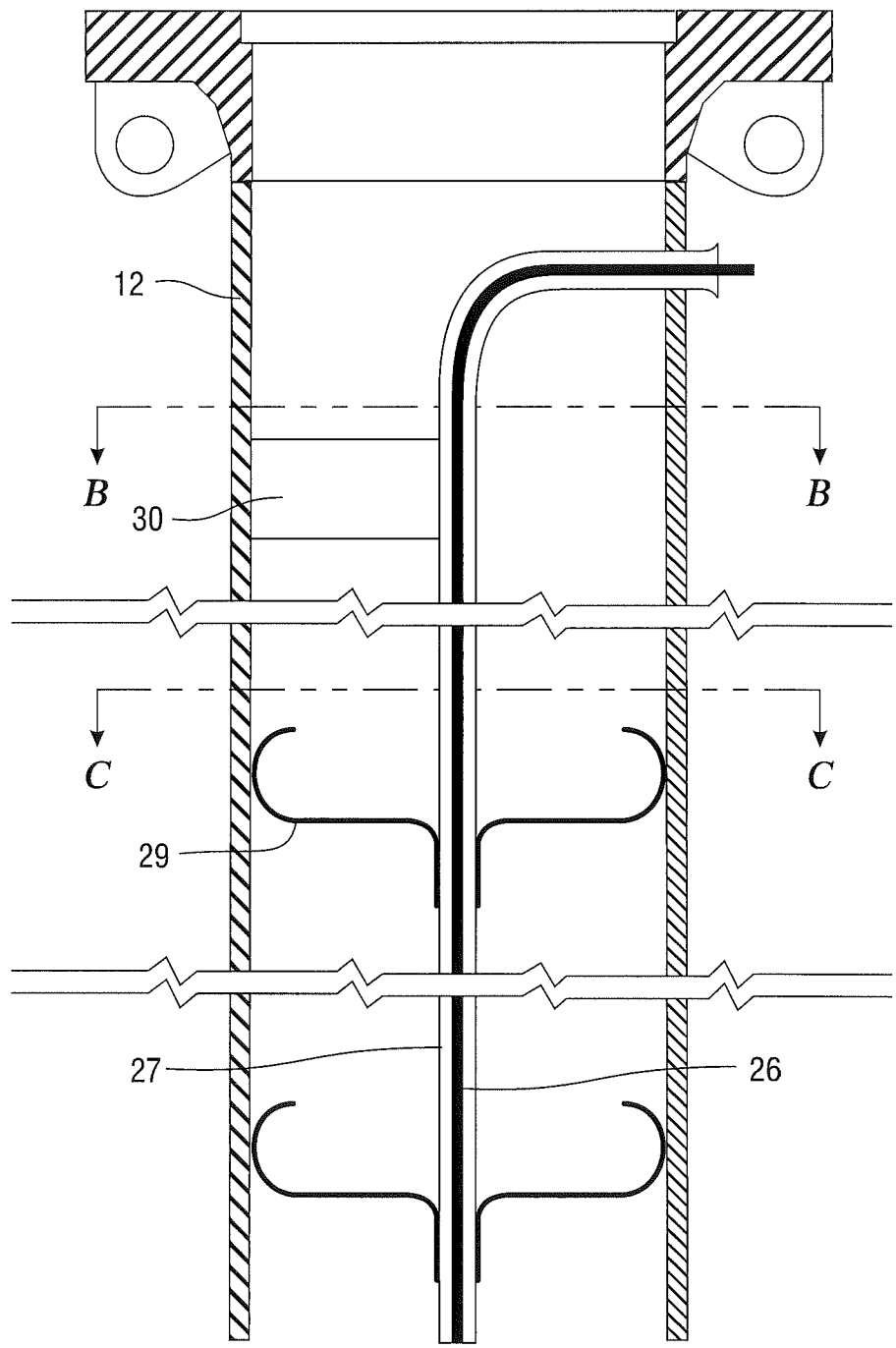
Figure 5:
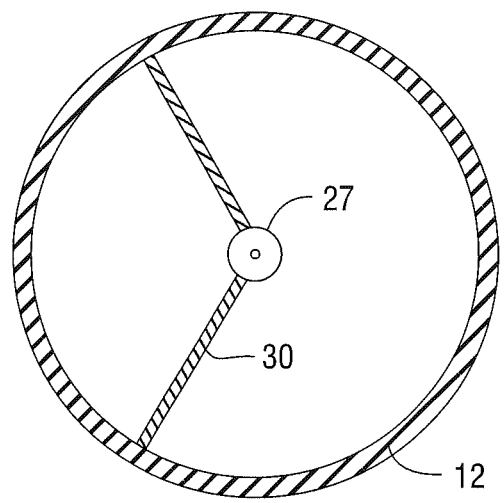
Figure 6:
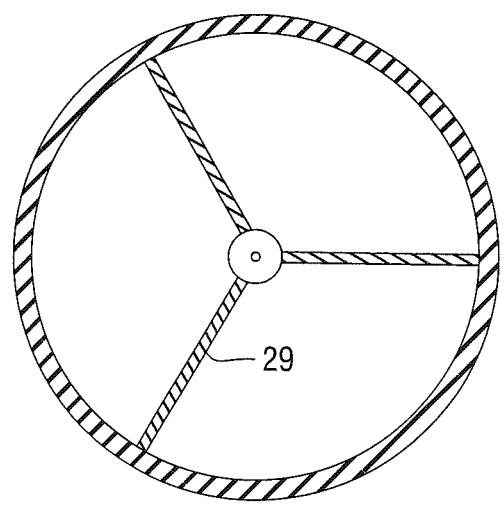

The oxygen blowing lance shown in FIGS. 1, 1A and 2 is made up of a shafted lance body 1 and a lance head 2 which is welded onto the body. For safety reasons, with awareness of the oxygen processing gas that is flowed through the lance, the lowest part of the lance head 2 is made from copper. Another reason for making the decision to use copper as the material for the lance head 2 is the good thermal conductivity of copper which makes it possible to effectively cool the lance head 2 with cooling water during blowing.

The lance head 2 comprises a nozzle body 2a, made of copper, with a crown of a total of six evenly spaced nozzles 3 and 4 in a circle and simply directed outwards, cooling chambers 5, 6, 7, 8, 9 and 10 as well as a central, axial strut 11. Coaxial, tubular fittings 2b, 2c, and 2d, are connected to the outermost cooling chambers which together with the nozzle body 2a form an interchangeable modular unit.

The lance body 1 consists of three coaxial tubes 12, 13 and 14 made from steel. Together with the incoming/feed connection piece 12a the inside tube 12 forms a central supply line 15 for the oxygen to be supplied to the blowing nozzles 3 and 4. A close sliding fit for 12a is provided in the upper area between the inside pipe 12 on the inside and the middle and outside tubes 13 and 14 which together form a single unit, on the outside. This close sliding fit at 12a serves for adjustment of the relative linear expansions between the tubes 12, 13 and 14 and the assembly of the lance body 2. Conduits 16 and 17 are developed between the inside tube 12 and the outside tube 14 as well as tube 13 that lies in between them. Of these conduits, the inside conduit 16 is the supply conduit and the outside conduit 17 forms the outlet conduit for the cooling water that is to be forced through the channels under high pressure. The cooling water is brought in and let out via laterally placed fittings 18 and 19.

In the central strut 11 of the nozzle body 2a there is a bore hole 20 into which an engaging and disengaging, rod-shaped thermoelectric couple is plugged in as the temperature probe 21. The temperature probe 21 is centered by an adapter 22 and held with its end in contact with the floor of the bore hole 20, which is recessed just a few millimeters opposite the front end 11a of the nozzle body. The adapter 22 is fastened with screws to the inside of the nozzle body. The temperature probe 21 is movable and stored in the adapter 22 and forced towards the floor of the bore hole 20 by a spring 23 that is supported on a regulating screw 25 screwed into the adapter 22. O-rings 25a seal off the central protective pipe 27 from oxygen supply tube 12 and oxygen conduit 15. Signal lines 26, which are installed in a central protective pipe 27, go out from the temperature probe 21. The lower end 27a of the protective pipe and the upper end 22a of the adapter 22 form a sealed, telescopic sleeve which makes it easier to switch out the lance head 2 and allows for various linear expansions of the approximately 20 meter long pipes 27 and 12.

The protective pipe 27 is kept centered at several axially distribute places on the inside walling of the inside tube 12 using springed, radial supporting elements 29 which allow for relative axial motion of the protective pipe 27 compared with the tube 12. The protective pipe 27 is attached directly to the tube 12 only at the top with radial struts 30 and scaled free from tube 12 and open to the atmosphere.

Because of the close sliding fit 12a with potential axial movement of the inside tube 12 and the middle as well as the outside tubes 13 and 14, to fit the lance body 1 with a new lance head 2, the regulating screw 25 is first screwed into the adapter 22 with the rod-shaped temperature probe 21. By doing this the adapter 22 is already preassembled on the inside of the nozzle body 2a so that the temperature probe 21 sits securely in the bore hole 20 after the regulating screw 25 is screwed in. The nozzle body 2a is then connected with its fitting 2d to the inside tube 12 on the point of separation 31 and welded on. In this way the middle and the outside tubes 13 and 14 are pushed back on to the inside tube 12 and the middle tube 13 respectively. Finally, the middle tube 13 and the outside tube 14 are brought close to the fittings 2b and 2c, where the middle tube 13 overlaps the fitting 2c with a close sliding fit and the outside tube 14 is welded on. The removal of a worn out lance head 2 is done in reverse sequence.

The special advantages of the disclosure are that the temperature is monitored at the places of an oxygen blowing lance which are critical with regard to a release of water, that is the front end 11a of the nozzle body that lies opposite the sensor focal point. In this way counteractive steps can be taken with as little delay as possible when there is the threat of a rupture, whether it be due to the mechanical wear and tear of the remaining wall thickness of the cooling chamber, or due to weakening of the chamber walls because of high thermal peaks when there is insufficient cooling during dismantling. Because of the practically immediate determination of the actual temperature it is also possible to consider the temperature over time when choosing what measures to take to avoid a rupture can be counteracted. Finally, it is an advantage that it is not only possible to protect the actual oxygen blowing lance from ruptures but that it is also possible to influence the factors which have an effect on temperature determination and on the regulation of the metallurgical treatment such as the inflow of oxygen, the distance of the lance head from the surface of the molten metal bath etc., to positively influence the refinement process. If for example a temperature is taken that falls far below the critical limit for a lance to rupture, a targeted reduction in the distance between the lance head and the surface of the molten metal bath is possible, through which the refinement process is accelerated and made more efficient.

Figure 7:
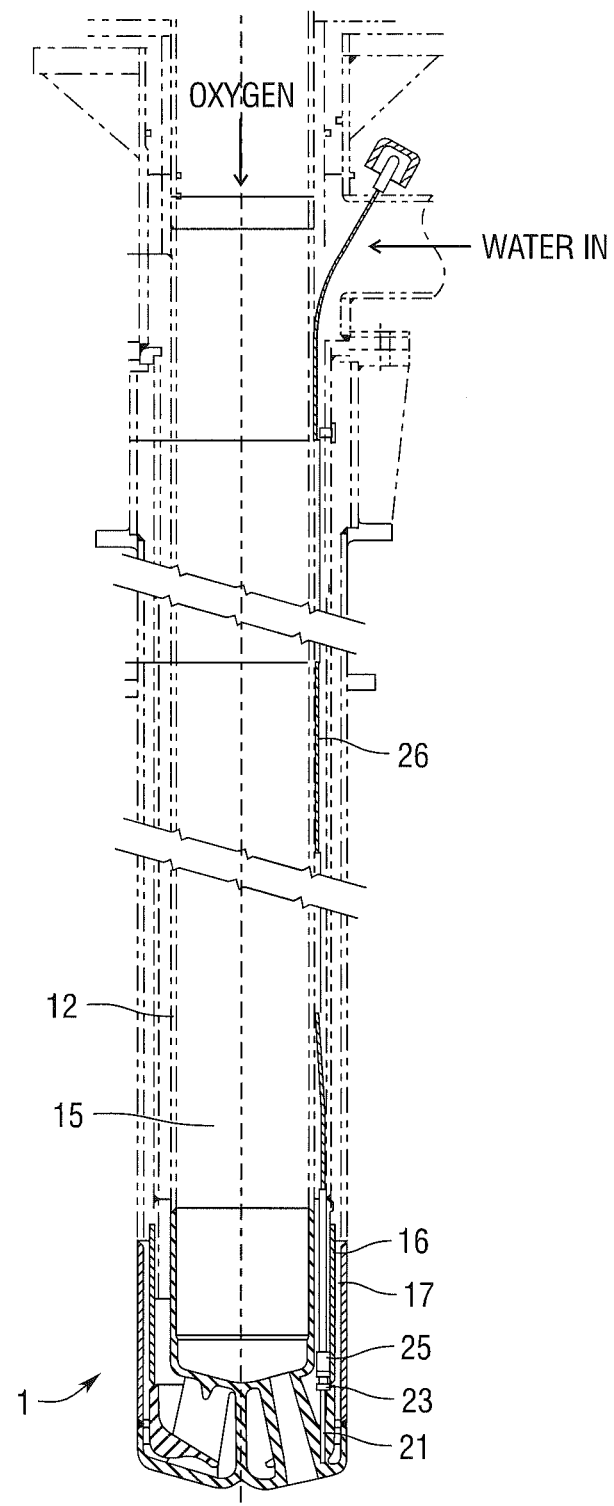
FIG. 7 shows an axial section of the lance with thermocouple disposed in cooling conduit instead of oxygen or delivered fluid conduit.
Figure 8:
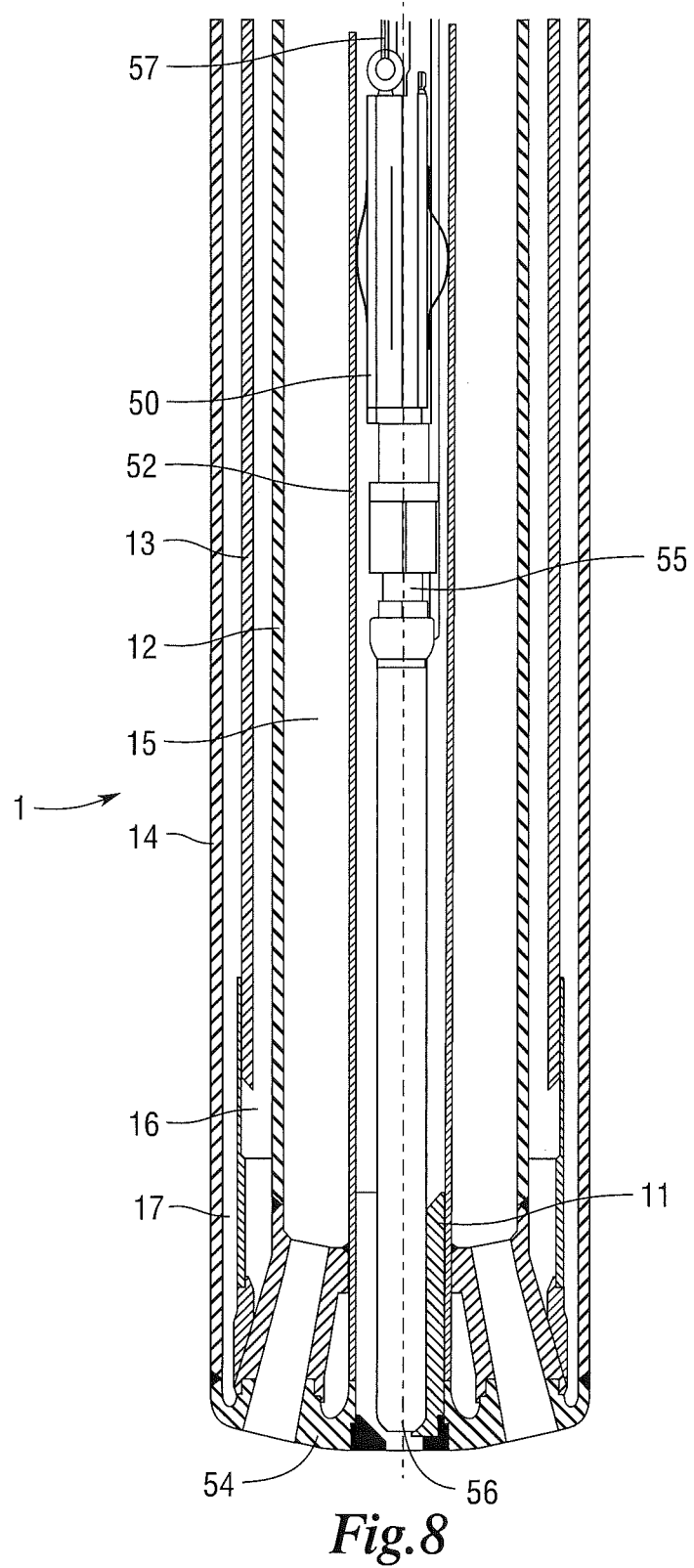
FIGS. 8 and 9 show an axial section of the lance with camera assembly disposed in the central oxygen or delivered fluid conduit of the lance.
Figure 9:
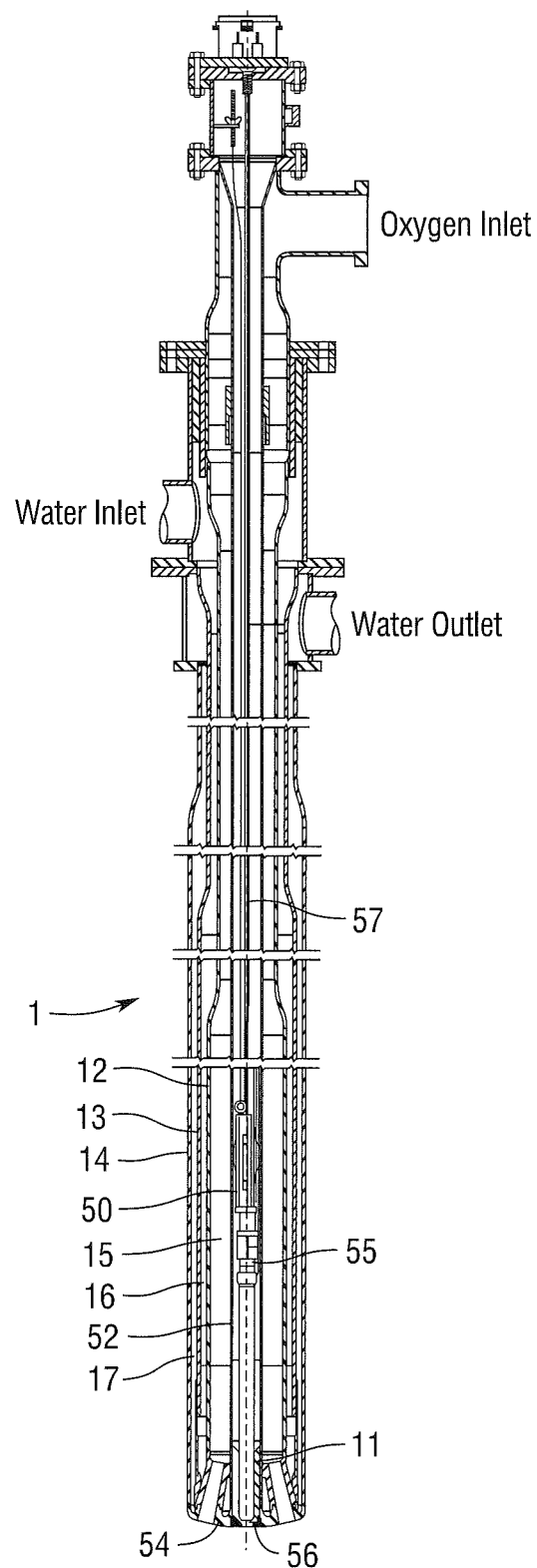

FIG. 7 shows that the thermocouple 21 may preferably be installed in inlet cooling fluid conduit 16 in the same manner as described above for installation in the oxygen or delivered fluid conduit 15.

Advantages of the present disclosure include: spring-loaded thermocouple 21 inserted into tip to remain in contact with face of lance tip when it expands during service. Spring-loaded thermocouple or standard thermocouple 21 can be used in both the water passages and/or oxygen passage. Modified center post 11 to allow mounting of thermocouple 21 and sealing glands. Free-floating thermocouple pipe 27 sealed by o-rings 25a. Thermocouple 21 can help with measurement of lance height by providing operating data. Thermocouple 21 can be used to provide temperature of copper tip in help determining wear and service life of tip. Thermocouple 21 can help with process temperature throughout the steel melting process by providing reading throughout the heat. Use of braided wire leads on Thermocouple 21 to allow for thermal expansion and ease of installation into lance and repair of lance. Thermocouple 21 is housed and sealed from oxygen and water in its own pipe 27 by o-rings 25a. Thermocouple pipe 27 can be pressurized for puncture or leak detection. Thermocouple 21 can be embedded in tip material, exposed to oxygen flow, exposed to water flow, or exposed to furnace atmosphere.

Similarly to having a thermocouple 21 installed in the lance 1, a camera assembly 50 and lens assembly 54 with lens 56 (such as those available from Enertechnix) preferably may be installed in lance 1 within protective camera pipe 52, the lower end of which corresponds to the central strut 11. The camera assembly 50 preferably passes through the oxygen or delivered fluid conduit as shown in the drawings and again is movable and preferably forced towards the floor of the bore hole by a spring 55 in the camera or laser assembly 50. Signal lines 57 installed in a central protective pipe 52 go out from the camera assembly 50. Preferably, camera assembly 50 may be installed in either cooling fluid conduit 16, 17 in the same manner as described above for installation in the oxygen or delivered fluid conduit. Also, the camera assembly 50 including lens 56 may be purged with nitrogen or argon gas through the camera pipe 52. Camera assembly 50 and/or camera pipe may be reinforced with ribs.

Camera assembly or optical instrument 50 provides for gathering/taking photos, videos and/or other optical based measurements such as spectroscopy or information from inside the furnace or molten heat in which the lance 1 is inserted.

What is claimed is:

1. An oxygen blowing lance comprising:
 a lance body including an oxygen conduit and cooling water inlet and outlet conduits surrounding said oxygen conduit;
 a lance head connected to said lance body and comprising a nozzle body, said nozzle body including a central strut having a bore hole, a plurality of nozzles arranged about said central strut, and a plurality of cooling chambers arranged about said central strut, wherein said plurality of nozzles are in fluid communication with said oxygen conduit for discharging oxygen from said oxygen conduit onto a metal bath in a converter vessel, and wherein said plurality of cooling chambers are in fluid communication with said cooling water inlet and outlet conduits;
 a camera assembly received in said bore hole for gathering/taking photos, videos and/or other optical based measurements or information from inside the furnace or molten heat in which the lance is inserted;
 signal lines connected to said camera assembly for conveying signals from said camera assembly whereby operation of said blowing lance is regulated in response to said signals; and
 a protective pipe pressurized with a gas surrounding said camera assembly and the signal lines.

2. The oxygen blowing lance of claim 1 wherein said protective pipe is disposed within said oxygen conduit or one of said cooling water conduits.

3. The oxygen blowing lance of claim 1 wherein said bore hole has a floor and wherein said oxygen blowing lance further comprises means for forcing said camera assembly toward said bore hole floor.

4. The oxygen blowing lance of claim 3 wherein said means for forcing comprise resilient means.

5. The oxygen blowing lance of claim 4 wherein said resilient means is a spring.

6. The oxygen blowing lance of claim 1 further comprising braided wire leads on the camera assembly.

\* \* \* \* \*